Oct. 20, 1959 P. G. THORNHILL Re. 24,724

METHOD OF AND APPARATUS FOR ROASTING METAL SULFIDE CONCENTRATES IN A FLUIDIZED BED

Original Filed April 30, 1954

2 Sheets-Sheet 1

INVENTOR
Philip G. Thornhill

BY
Pennie, Edmonds, Morton, Barrows & Taylor
ATTORNEYS

Oct. 20, 1959 P. G. THORNHILL Re. 24,724

METHOD OF AND APPARATUS FOR ROASTING METAL SULFIDE CONCENTRATES IN A FLUIDIZED BED

Original Filed April 30, 1954 2 Sheets-Sheet 2

INVENTOR
Philip G. Thornhill

BY
Pennie, Edmonds, Morton, Barrows & Taylor
ATTORNEYS

United States Patent Office

Re. 24,724
Reissued Oct. 20, 1959

24,724

METHOD OF AND APPARATUS FOR ROASTING METAL SULFIDE CONCENTRATES IN A FLUIDIZED BED

Philip G. Thornhill, Falconbridge, Ontario, Canada, assignor to Falconbridge Nickel Mines Limited, Toronto, Ontario, Canada, a corporation of Canada Original No. 2,813,015, dated November 12, 1957, Serial No. 426,752, April 30, 1954. Application for reissue November 12, 1958, Serial No. 773,533

21 Claims. (Cl. 75—9)

Matter enclosed in heavy brackets [ ] appears in the original patent but forms no part of this reissue specification; matter printed in italics indicates the additions made by reissue.

This invention relates to the fluidized bed roasting of metal sulfide concentrates and has for its object improvements in the method of [and apparatus] for treating metal sulfide bearing slurries in roasting furnaces which operate on the fluidized bed principle.

More particularly, the present invention relates to the introduction into a fluidized bed roasting furnace of metal sulfide slurries which contain advantageously slime particles and/or water soluble materials whereby the agglomerative action of the slimes and water soluble materials becomes an advantage rather than a detriment to the fluidized bed operation. In other words, a specific object of this invention is to prevent the formation of oversized solid masses which would otherwise accumulate in the fluidized bed, and to form instead very small agglomerates which present a number of process and treatment advantages.

In the past, metal sufide slurries have normally been pumped into the fluid bed roasting furnace through a horizontal feed tube located in the furnace wall at a point below the surface of the turbulent bed or just above it. Since, in either of these methods of introducing slurry into the furnace, dehydration of the slurry must take place in the fluidized bed itself, the turbulence of the bed is depended upon to effect the disengagement of the individual particles comprising the masses of slurry as the drying of the latter progresses. In other words, so long as water is the sole bonding agent in the slurry, its disappearance through evaporation in the roasting bed leaves the individual particles free to take their places as single entities in the bed, supplying to the bed new material having a particle size distribution substantially equivalent to that obtaining in the slurry. Thus when the normal substantially slime-free sulfide flotation concentrates are fed to the roaster bed as aqueous slurries containing no more water soluble materials than normally occur as residual flotation reagents and impurities, the conversion from slurry to discrete solid particles is uninterrupted, and while this results in relatively smooth operation of the roaster, dust carry-over is often inordinately high.

If, on the other hand, the slurry undergoing treatment contains certain types of slime materials and/or water soluble materials such as a salt or salts, the slurry, even after complete drying, fails to disintegrate in the manner described above, and much of the new material thus introduced to the bed agglomerates; the agglomerates tend to increase in size and to remain as oversized lumps which defluidize the bed and render the process inoperative. That is to say, the slimes and water soluble materials function as intergranular adhesives in the slurry masses, preventing the particles from being broken up by the turbulent action of the fluid bed, even after complete dehydration and subsequent roasting have taken place. Not only is the adhesive action of the aforementioned materials effective between fresh slurry particles, but it can also cause agglomeration between freshly introduced slurry and the particles comprising the fluidized bed to which it is added. In this way, the continued addition of such slurries directly to the bed results in the formation of increasing proportions of agglomerates which may be classed as oversize lumps in the terms of the particle sizes desirable in fluidized beds employed for the roasting of sulfides, viz., in excess of about 4-mesh. It can thus be readily appreciated by those skilled in this art that the formation in the fluidized bed of increasing proportions of agglomerates larger than about 4-mesh can result only in eventual loss of fluidity in the bed and termination of the roasting operation.

The formation of oversize lumps in the manner described above is further aggravated by either of the conventional methods of feeding slurries of the type with which this invention is concerned. For example, when slime- or salt-bearing metallic sulfide slurries are fed to a fluidized bed at a point below its surface, there is a tendency for hard, partially roasted accretions of sulfides to form on the feed nozzle. Such accretions often cause blockage of the feed tube, upsetting the smooth operation of the roaster. More serious, however, is the effect of these accretions on bed fluidity, since they break off and accumulate in the bed with the other defluidizing oversize lumps. On the other hand, when such a slurry is fed horizontally into the furnace at a point above the surface of the fluidized bed, a considerable proportion of the slurry simply falls, or drips from the mouth of the feed tube, which is necessarily located near the roaster wall. The part of the bed near this zone is somewhat less mobile than the center of the bed because of a so-called "wall effect," and it is, therefore, particularly disadvantageous that slurry should fall at this point. Moreover, since the gases surrounding the feed nozzle are at a temperature approaching that obtaining in the roasting bed, the dripping slurry results in a gradual build-up of hard, caked material on the nozzle. The caked nozzle accretion falls into the bed, further decreasing its mobility and fluidity. As this process is repeated, bed turbulence near the feed nozzle is eventually brought to a standstill, and the result is a mound of raw, caked sulfides extending from the bed to the feed tube, and which grows outwardly from the wall toward the center of the bed as operation continues. This inactive mound reduces the effective hearth area, and hence the capacity, of the furnace. The introduction of compressed air along with the slurry in the feed tube does little to alleviate this condition, and has the added disadvantage of often imparting sufficient velocity to the slurry to carry it to the opposite wall of the furnace, where it builds up in the form of hard cakes of raw sulfides which eventually fall into the bed, contributing further to its loss in fluidity.

The deleterious effects of slime or water soluble materials such as salts in the sulfide slurry fed to the fluidized bed roasting furnace are cumulative in nature since the turbulence of the fluidized bed is the sole agent by which the initially oversized accretions or agglomerates might be broken up when slurry is fed directly to the bed. The presence of these accretions in the fluidized bed causes a deterioration in bed fluidity or turbulence, which in turn not only increases the tendency for more agglomerates to form, but also decreases the likelihood of their being broken up, having once formed. Such cumulative deterioration results eventually in complete loss of fluidity, and the roaster must be shut down and cleaned out.

Investigations have led to the discovery that such operational difficulties can be overcome for the most part and that other advantages can be gained when proceeding in accordance with the present invention.

The invention contemplates the roasting of metal sulfide concentrates in a fluidized bed, in which a slurry is prepared by mixing metal sulfide concentrates and slimes with an aqueous liquid. The slurry is sprayed a sufficient distance into and through the hot freeboard space above the fluidized bed to produce a great multiplicity of very small wet agglomerates, the wet agglomerates being formed of a plurality of concentrate particles bonded by the slimes and liquid of the slurry. If it should happen that excess aqueous liquid is freed from the slurry as a result of the formation of the wet agglomerates, it is vaporized completely in the freeboard space with the hot gases rising from the fluidized bed to prevent the freed liquid from reaching and wetting the fluidized bed. The freshly formed agglomerates are passed through an extended path of travel in the freeboard space to provide sufficient time for the removal of their moisture, the moisture being evaporated from the agglomerates while in transit in their extended path of travel through the freeboard space and in contact with the hot gases to produce dried agglomerates and to prevent damp agglomerates from reaching and damping the fluidized bed. The resulting mixture of vapors and gases is vented from the upper portion of the freeboard space; and the dried agglomerates are dropped onto the fluidized bed for roasting. The agglomerates in the fluidized bed are maintained continuously dry to inhibit bonding thereof into oversize lumps which would operate to defluidize the bed. The dried agglomerates are roasted autogenously in the fluidized bed; and are maintained generally in their same physical size and shape during the roasting operation to ensure uniform fluidity of the bed. The resulting calcined agglomerates are removed from the fluidized bed.

In accordance with a presently preferred practice of the invention, a slurry feed tube is situated in the roof of the fluidized bed roasting furnace and is directed toward the center of the surface of the fluidized bed. It is thus possible, in making use of this arrangement, to impart spray forming velocities to the slurry stream, with or without a concurrent flow of compressed air, without danger of forming accretions of raw sulfide on the furnace walls. The finely divided slurry agglomerates so formed then present an extremely high surface to volume ratio during their descent countercurrently through the hot gases rising up through the furnace freeboard. These factors make for dehydration of the slurry agglomerates while falling, precluding any tendency for them to bond into oversize lumps on reaching the bed. The dried agglomerates which are produced in this way are formed of such a wide size range as to provide new bed material highly satisfactory for the maintenance of fluidity. Moreover, when the slurry feed tube is held in a vertical position there is no tendency for dripping slurry to build up in the form of caked material on the end of the tube, so that the latter remains clear at all times; making possible smooth and continuous operation of the roaster.

The slurry-agglomerate drying feature of the present invention may be better understood if compared to a two-stage process in which sulfide slurry is subjected to a distinctly separate drying treatment prior to its introduction to the roaster as dry solids. One method of carrying out the drying step would be to spray the slurry vertically downward into a spray drying tower countercurrent to upwardly flowing hot gases, and to collect the dried material at the bottom of the tower. The dried material would then be fed to the fluidized bed roasting furnace by means of a mechanical or pneumatic conveyor. In the present invention, the freeboard space in the fluidized bed roasting furnace is used as the drying tower, with great advantage in simplicity of operation.

The intergranular binding action of slime or water soluble materials in the slurry is used to advantage from sulfide slurries containing such materials are fed from the top of the roaster in that the sprayed slurry particles and freshly formed agglomerates during their descent through the roaster freeboard, act as collecting nuclei to which dust, entrained in the rising furnace gases, adheres, and with which such dust is returned to the bed. This interaction between the sprayed slurry particles and freshly formed agglomerates, on the one hand, and dust, on the other hand, borne by the roaster gases appears to be a doubly advantageous function in the roasting process since the adherence of the dust to the moist slurry and agglomerates results not only in the effective removal of dust as such from the system, but also in the formation of relatively dry surfaces on the slurry agglomerates, preventing them from agglomerating still more before they have been completely dehydrated in their descent through the freeboard.

While the invention relates to the fluidized bed roasting of metal sulfide concentrates generally, investigations indicate its applicability particularly in the treatment of such concentrates obtained from the ores of nickel, copper, zinc, gold, iron, etc.

One of the principal sources of nickel at present is the well known Sudbury ore in Canada. Its metals, more especially nickel, cobalt, copper and iron, are present in the ore as sulfides. The nickel-bearing constituents of the ore comprise, to a considerable extent, pyrrhotite which contains nickel in concentrations of about one-half of one percent to about one percent by weight of pyrrhotite, in a form not separable from the pyrrhotite by known mechanical methods. The inclusion of this pyrrhotite fraction reduces necessarily the nickel assay of a smelter feed to an undesirably low value, and brings about a corresponding increase in the quantity of iron that must be slagged off in the smelting process.

In one application of the present invention substantially all of the nickel, cobalt and copper, occurring in a concentrate consisting mainly of the type of pyrrhotite mentioned, is rendered extractable in a highly useful water-soluble sulfate form, leaving an iron residue in a highly useful water-insoluble oxide form, if desired of sufficient purity to be employed as a source of high grade iron ore. The iron may be separately recovered by known methods, as may the nickel, cobalt and copper.

The pyrrhotite concentrates may be obtained from the nickeliferous ore by any well known method, but the size of the nickel-bearing sulfide particles must be such that the so-called "kernel roasting effect" (to be described below) is substantially avoided. Investigation shows that that effect is largely overcome by the employment in the process of a concentrate of which at least about 90% can be passed through a 200-mesh screen.

Experiments have also shown that in order to render the contained nickel in a water soluble form it is necessary that a salt of an alkali metal such as sodium be in contact with the pyrrhotite particles while they are roasting. Sodium sulfate has proven to be the most suitable reagent for this purpose because of its general availability.

A slurry is prepared by mixing the salt solution and the concentrate particles to an optimum consistency, one that facilitates feeding of the slurry to the roasting furnace. The slurry is fed to a fluidized bed roaster. Although the concentrate particles are dispersed in the slurry fed to the furnace, they tend quickly to form agglomerates.

This happens as follows: The slurry is pumped under pressure from a container through an injection tube leading to the open space in the upper portion of the roaster. The slurry is made to enter the roaster in the form of a spray, which is formed either by having the injection tube terminate in a spray head of suitable design, or by mixing compressed air with the slurry in the injection tube. In either case it is necessary to have the slurry enter the upper part of the freeboard space of the roaster in the form of a spray of slurry droplets, the largest of which droplets do not exceed in size the maximum tolerable size of particles comprising the fluidized bed.

The size of the agglomerates may be controlled by a suitable regulation of the variables encountered at this stage, including the consistency of the slurry, the size of the injection tube, the pressure and amount of compressed air injected into the tube. During the extremely rapid drying stage the salt solution reaches a concentration where it functions as a binding agent to form in situ agglomerates of the concentrate particles. The newly formed agglomerates are kept in suspension in the freeboard space long enough thoroughly to dry them before they reach the fluidized bed. The agitation or turbulence of the bed and hence of the agglomerates is sufficient to prevent them from adhering or sticking to one another, ensuring that the particle sizes in the bed fall within the optimum range, not larger than about 6-mesh.

The fluidized bed roasting of the dry agglomerates formed in situ is carried out within an optimum temperature range. A temperature not lower than about 600° C. and not higher than about 700° C. has given excellent results. The roasting reactions take place autogenously and the control of the temperature is effected by the adjustment of the feed rate and, if necessary, by the injection of water into the freeboard zone. The rate of flow of air into the fluidized bed is at least as great as that required by the feed rate on the basis of the desired stiochiometry, and tests indicate that calcines satisfactory to the process can be produced when the rate of air flow exceeds this value by as much as 300 percent.

The particular advantages afforded by the employment of agglomerates of pyrrhotite concentrate particles held together by a network of sodium sulfate become more evident when the behaviour of such agglomerates in a fluidized bed is considered. So far as the mechanics of the fluidized bed is concerned, each agglomerate is a separate entity, and, as such, is subject to the uniformity of temperature and gaseous environment obtained by the constant turbulence of a fluidized bed. On the other hand, the particles comprising the agglomerate remain in contact with the same bonding network of salt throughout the entire treatment, a situation of prolonged contact which is essential to the successful function of the sodium salt in its capacity as a chemical reagent. In spite of the efficacy of the salt as an inter-particle bonding agent in an individual agglomerate, there is no tendency for the agglomerates to become attached to one another during the fluidized bed roasting treatment. In other words, the agglomerates do not cake up and cause loss of fluidity in the bed.

The selective sulfate roasting of the nickeliferous pyrrhotite is based upon the thermodynamic relationships existing between the sulfates of the metals present in a concentrate which is rich in this mineral. Under practical roasting conditions the thermodynamic stabilities of the metal sulfates decrease in this order: cobalt, nickel, copper and iron. Since the stabilities of these sulfates are direct functions both of the temperature and the partial pressures of the oxides of sulfur present in the system, the proper control of these variables can result in a system in which the sulfates of cobalt, nickel and copper are stable thermodynamically, while those of iron are not. Moreover, if the pyrrhotite and other contained metal sulfide minerals are made to undergo the roasting reactions at a satisfactory rate in the same system, the end products of such reactions are calcines consisting substantially of iron oxide and the sulfates of cobalt, nickel and copper. In other words, the iron is rendered water-insoluble while the cobalt, nickel and copper are rendered water-soluble.

The cobalt and copper sulfides in the pyrrhotite concentrates can be converted to their sulfates, and thus be rendered water-soluble, quite readily when such concentrates are roasted under suitable conditions of temperature and gaseous environment. The nickel sulfide, as pointed out, shows a strong tendency to avoid sulfate formation. Its refractory nature appears to be due to such causes as the following:

(1) The ability of the nickel sulfide to form relatively stable nickel ferrites of variable composition; and (2) The "kernel roasting" effect by which the nickel in an iron-nickel sulfide particle tends to become concentrated in the residual sulfide core of the hot particle as roasting proceeds. The progressive increase in the proportion of nickel in the residual sulfide is accompanied by a decreasing tendency for the nickel sulfide to participate in the required roasting reactions. This is due, in part, to the more densely protective nature of the iron oxide which is formed during the latter stages of the oxidation of the particle. The effect is a direct function of particle size. That is to say, the smaller the concentrate particle the less is the "kernel roasting" effect thus assuring substantially complete conversion of the nickel sulfide in the particle to the desired nickel sulfate during the roasting operation. Such conversion is assured when using extremely fine concentrates, with a particle size, for example, as small as or no larger than that herein specified.

While the principle of particle size reduction is employed widely when an increase in reaction rate between solids and gases is desired, the end in the present invention is not so much an increase in reaction rate as the prevention of the selective oxidation of the nickel bearing iron sulfides which results in the "kernel enrichment." The effect of kernel enrichment is cumulative, for as the iron in a concentrate particle is removed from the nickel sulfide to form an iron oxide coating, there is a tendency for the kernel to achieve such a concentration in nickel as to provide a nickel to iron ratio approaching that which, when oxidized, would form dense protective nickel ferrite layers between the nickel sulfide and the iron oxide coating. Also, sulfides high in nickel are much more difficult to oxidize than sulfides low in nickel.

An even more important advantage afforded by the employment of extremely finely divided pyrrhotite particles is their amenability to agglomeration, which is essential to the practice of this invention. As will be shown later, this tendency for finely ground pyrrhotite concentrates to form agglomerates is enhanced by the binding action of the added sodium sulfate.

In general the tests indicate that the concentration of the salt additions necessary appears to depend, to some extent, upon the concentration of nickel in the pyrrhotite. The primary chemical function of the sodium sulfate is to render unstable the ferrites of nickel. This is probably effected by an exchange between the sodium sulfate and nickel ferrite similar to the reaction expressed by the following hypothetical equation:

$$NiFe_2O_4+Na_2SO_4=Na_2Fe_2O_4+NiSO_4$$

From the above, it can be seen that the effective functioning of the sodium sulfate depends largely upon the intimacy of contact between that salt and the roasting sulfide particles as well as on the maintenance of a gas-temperature relationship which provides conditions under which nickel sulfate remains stable. Thus, while the required amount of sodium sulfate addition to the pyrrhotite depends on the concentration of the nickel, that portion of the sodium sulfate which is effective in the above reaction is limited by the extent to which it remains in contact with the roasting ore particles. As will be shown later, this limit is reached with $Na_2SO_4$ additions of about five percent by weight of dry pyrrhotite concentrate, beyond which proportions further additions are ineffective because of particle surface limitations.

The sodium sulfate also acts as a carrier, or in a sense a catalyst, for the sulfating reaction. Sodium sulfate, $Na_2SO_4$, in the furnace, takes on $SO_3$ formed by the oxidation of $SO_2$ as it passes mixed with excess air through the bed.

$$Na_2SO_4+SO_3 \rightarrow Na_2S_2O_7$$

Sodium pyrosulfate is thus formed, which is in itself a vigorous sulfating agent.

The stability of the pyrosulfate is an inverse function of temperature and a direct function of the concentration of $SO_3$ in the gases surrounding it. Qualitatively, similar conditions hold for the sulfates of nickel, cobalt and copper. For the sake of simplicity the following two equlibria may be abstracted for consideration.

(1) $$Na_2SO_4+SO_3 \rightleftharpoons Na_2S_2O_7$$

(2) $$NiO+SO_3 \rightleftharpoons NiSO_4$$

The nickel sulfate is more stable than the sodium pyrosulfate indicated by the reactions. It may be assumed that one of the agglomerates, for example, in the course of its roasting treatment, encounters varying conditions of temperature and $SO_3$ concentration, or, in other words, conditions that are not always favorable for the formation of sulfates. It seems reasonable to suppose then that, while the agglomerate is in a zone favorable to sulfation, both reactions (1) and (2) progress to the right, to form both sodium pyrosulfate and nickel sulfate. When such an agglomerate moves to a less favorable zone, reaction (1) is reversed, thus restoring the concentration of $SO_3$ necessary for the progress of reaction (2) to the right. In this way the sodium sulfate acts as a sulfur trioxide, $SO_3$, reservoir or "buffer," ensuring adequate local concentration of the sulfating agent. This is, of course, in addition to the role of sodium in preventing the formation of ferrites.

Such fines as do result from the roasting operation are advantageously returned to the fluidized bed. The fines themselves may be separated from the gaseous mixture arising from the bed in any suitable manner, such as by passing the mixture through one or more cyclones. The fines recovered by the cyclones may be returned, for example, by forcibly injecting them by means of an enclosed screw conveyor into the bed. The return of the fines to the bed offers several important advantages: First, it helps to maintain a small, but essential, proportion of fine material in the bed to assure conditions favorable to the maintenance of fluidity. Second, it permits enrichment of the fluidized bed with additional amounts of sulfating gases. These gases result from the decomposition at bed temperature of iron sulfates which have formed during the passage of the dust through the cooler zones of the system, such as the furnace freeboard, or open space, above the bed and the ducts to and through the dust recovery system. Third, particles in the dust which have short-circuited the fluid bed treatment by premature entrainment in the gases are returned for further roasting and sulfating treatment in the bed.

As already indicated the calcines resulting from the selective sulfate roasting operation consists of agglomerates of material which retain substantially their original geometric identity. The calcine agglomerates can undergo subsequent handling, including a water leaching operation, without losing their shape or hardness. All of the water soluble material can be extracted from them by aqueous treatment without the necessity of subjecting them to any further treatment, such as grinding or other form of disintegration. This affords a distinct advantage over the conventional type of calcine obtained from finely ground nickel sulfides in that all of the subsequent steps in the process, such as leaching, filtration and drying are greatly facilitated by the presence of relatively small proportions of fine material.

These and other features of the invention may be better understood by referring to the accompanying drawing, taken in conjunction with the following description, in which Figure 1 is a diagrammatic side elevation, partly in section, of a form of apparatus illustrative of a practice of the invention;

Figure 1:
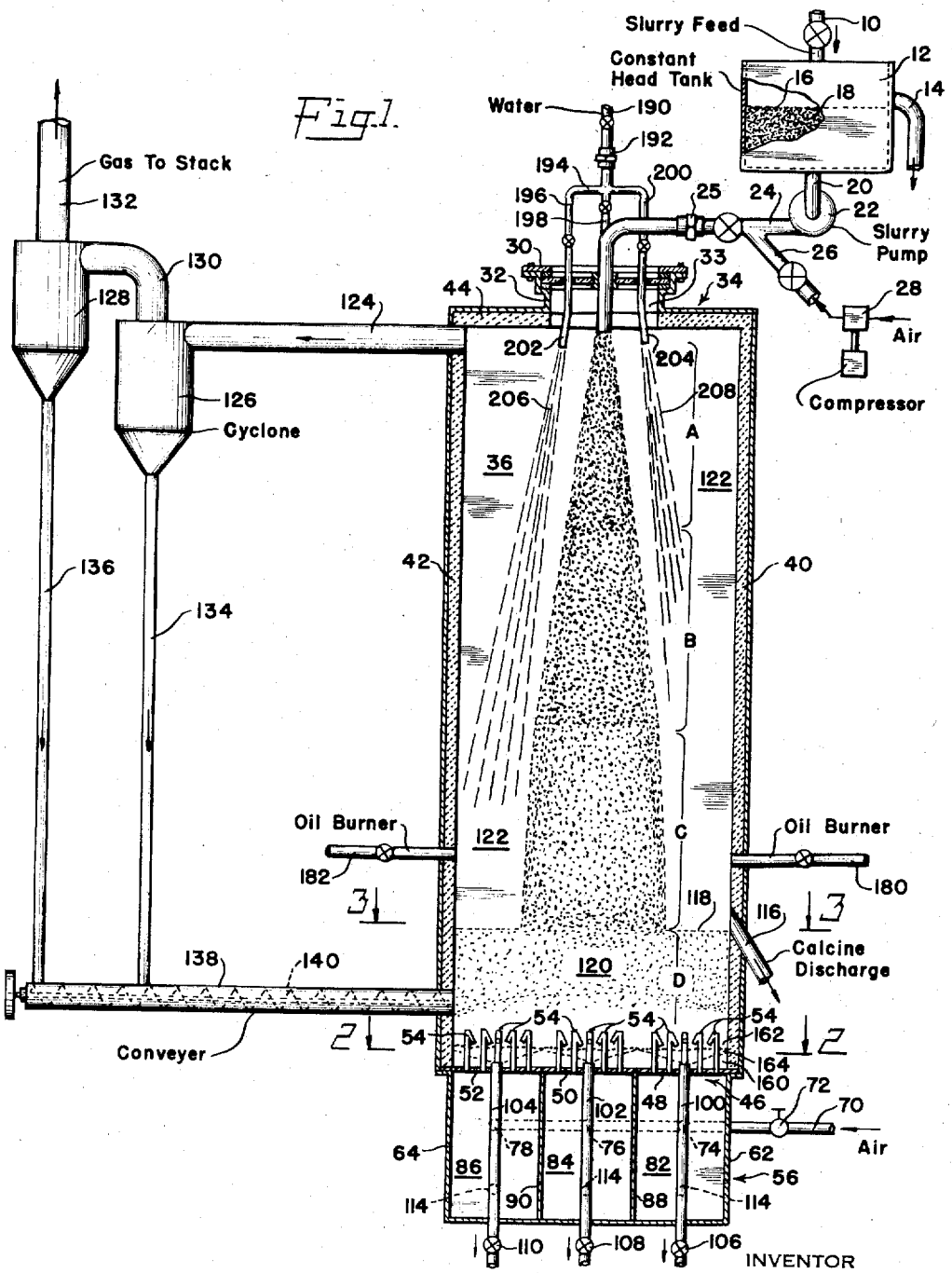

Referring first to Figure 1, the apparatus shown includes a valved slurry feed line 10 depending over a constant head tank 12, provided with an overflow line 14 near its top to maintain a constant level 16 of slurry 18 in the tank. Connecting the bottom of the tank is a discharge line 20, a slurry pump 22 and a valved slurry feed line 24, fitted with a coupling 25. An air line 26 connects an air compressor 28 with the slurry feed line. The slurry feed line in turn extends vertically through a removable cover 30 on a hood 32 mounted centrally around a man-hole 33 on the top of a roaster 34.

The fluidized bed roaster shown diagrammatically is generally rectangular in elevation and cross-section, being formed of insulated (Figures 2 and 3) side walls 36 and 38, end walls 40 and 42 and a roof 44 (Figure 1). The roaster's hearth 46 (Figures 1 and 2) includes three removable plates 48, 50 and 52, on the tops of which are secured a plurality of spaced and raised air-discharge nozzles 54.

Figure 2:
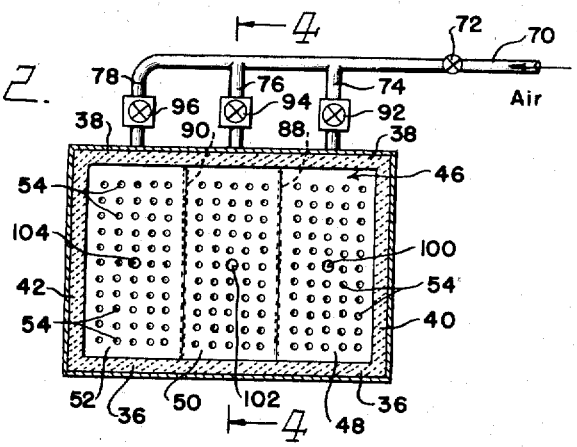
Figure 2 is a section on the line 2—2 of Figure 1, showing the hearth of the roaster.
Figure 4:
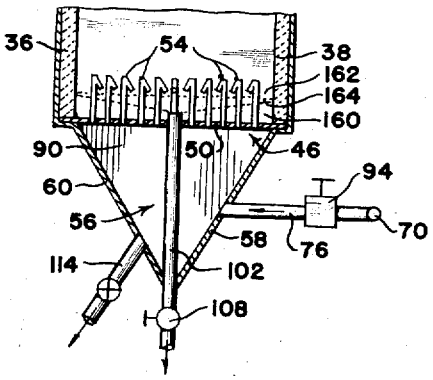
Figure 4 is a section on the line 4—4 of Figure 2, showing a wind-box below and a plurality of air-distributors above the hearth.

The bottom of the roaster terminates in an air distributor or wind-box 56 (Figures 1 and 4), which is generally triangular in vertical-section (Figure 4). It is formed of side walls 58 and 60 and end walls 62 and 64. An air distributor line 70 (Figures 1 and 2), with a valve 72, extends along the far side of the box. Branch outlets 74, 76 and 78 connect the distributor line with three compartments 82, 84 and 86 formed by partitions 88 and 90 (Figures 1 and 2). The branch inlets are provided with valved meters 92, 94 and 96 (Figure 2) to regulate and measure the amounts of air introduced into the compartments.

Figure 5:
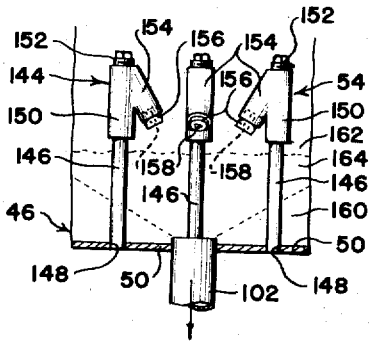
Figure 5 is an enlarged fragmentary detail from Figure 4, showing a few of the air-distributors immediately adjacent a discharge conduit extending from the hearth through a wind-box.

Hearth plates 48, 50 and 52 (Figure 2) extend across the compartments and are fitted, respectively, with centrally disposed discharge pipes 100, 102 and 104, the upper ends of which extend slightly above the plates (Figures 4 and 5). The discharge pipes depend vertically through and below compartments 82, 84 and 86, being fitted with valves 106, 108 and 110, respectively. Each compartment is fitted near its bottom (Figure 4) with a valved discharge pipe 114 for the removal of solids.

The roaster is provided (Figure 1) with a calcine discharge conduit 116 in end wall 40, being located to maintain an optimum predetermined level 118 of a fluidized bed 120 of agglomerated material undergoing treatment below freeboard space 122. A gas-fines discharge duct 124 connects the top portion of the roaster with a gas-fines separator 126, such as a cyclone. The cyclone advantageously connects a second gas-fines separator 128, such as another cyclone, by means of a pipe 130. A stack 132 extends from the second cyclone to the open atmosphere.

It is advantageous to return the fines, separated from the roaster gases in the cyclones, to the roaster for retreatment. To this end (Figure 1) down-comers 134 and 136 extend from cyclones 126 and 128, respectively, to a lateral feed tube 138 fitted with a power-driven screw conveyor 140. The discharge end of the tube connects with the lower portion of fluidized bed 120.

Air-discharge nozzles 54 may be of any suitable design. The ones used in the present apparatus are illustrated to better advantage in Figure 5. They are in the form of standard pipe couplings or fittings 144 mounted on the upper ends of pipe nipples 146 secured to plates 48, 50 and 52 in the manner shown. They are secured at their lower ends in holes 148 spaced at 4" centers in plates 48, 50 and 52 in the manner shown. The upper ends of the nipples fit into vertical portions 150 of the couplings. The upper ends of the vertical portions are closed with plugs 152; and the lower ends of the inclined portions 154 of the couplings are fitted with similar plugs 156, each of which is provided, however, with a centrally disposed small jet hole or passageway 158 for the escape downwardly, at an acute angle to the vertical, of very fine streams of air. Although not so shown on the drawing, in the present practice the jets face in the same direction.

Since passageways 158 point downwardly, fines from the bed of fluidized material cannot fall into and clog them. Also, since the plugs 156 are located above the hearth plates, the material near the plates is unaffected by the fluidizing gases, and remains static when calcines are removed through calcine discharge conduit 116. This results in a dead overall layer 160. This is beneficial because the layer acts to insulate the plates. As will be pointed out below this overall layer in turn may be considered as formed of an over layer 162 of normal size agglomerates and an under layer 164 containing oversize agglomerates, if present. The layers tend to shift relatively to each other, in size and contour during operations.

One or more heaters 180, 182, such as oil or gas-burners, are associated with the roaster to bring the chamber to temperature to initiate the roasting operation. The heaters are located advantageously just above the surface of bed 120.

It is highly desirable to be able to control the temperature of the operation, the bed as well as the freeboard. Since the roasting takes place autogenously, exothermic heat is released in the bed and rises with the roaster gases into the freeboard. Some control of the temperature of the bed may be effected by varying the rate at which the slurry is fed above and air is introduced below the hearth of the furnace. To lower the bed temperature it has been proposed also to wet it with water, a stream of water being played onto or released in the bed for the purpose. This is objectionable, however, because the damp material tends to lump and hence to defluidize the bed. That result may be avoided by introducing one or more streams of water into the freeboard space, and evaporating all of it before it reaches the bed.

To this end the apparatus (Figure 1) may include, for example, a valved main water supply line 190, having a coupling 192, which connects with a lateral distributor line 194 having valved branch feed lines 196, 198 and 200. Side branch lines 196 and 200 extend vertically through the peripheral portion of man-hole cover 30, their open free ends 202 and 204 being directed outwardly so that streams of water 206 and 208 sprayed therefrom may be directed away from and generally along the side of the conical slurry stream being sprayed from feed line 24. The water or liquid composition, and hence the viscosity, of the slurry is not altered substantially when operating in this manner. Mid branch line 198 connects slurry feed line 24 so that, if desired, additional water may be added to the slurry with which to cool the freeboard. The construction shown has the advantage that couplings 25 and 192 permit the slurry and the water branch lines to be removed with the cover as a unit. Water feed lines may be led into the freeboard at any other suitable place in its top or upper portion; the requirement being that the sprayed water must have sufficient time during its descent to be evaporated before reaching the fluidized bed.

Closeable openings, not shown, are provided in the chamber walls, at various levels, for the introduction of calcined starting material, for the insertion of thermocouples to determine and regulate the temperatures of the bed and open space above the bed, for observation and inspection, etc.

The apparatus described may be operated as follows:

Previously calcined agglomerates of the concentrates are fed to the roaster through one or more of the closeable openings, not shown, to build up a starter-bed. Such a bed is necessary to initiate the roasting operation to follow. That is to say, the material to be roasted must be mixed in the roaster with material that has already been roasted. Prior to the introduction of raw sulfide concentrates, the starter bed must be heated to a temperature sufficiently high to permit the roasting operation to be self-sustaining. To this end (Figure 1) oil or gas burners 180, 182 are used to provide the preliminary heat. When the bed has achieved the temperature required to initiate the combustion of the sulfides, the burners are shut off.

Slurry 18 is formed by mixing the concentrates with a water solution of sodium sulfate, after which it is passed (Figure 1) through feed line 10 into tank 12. A sufficient amount is fed into the tank to cause a continuous overflow of slurry through line 14 to maintain the body of slurry in the tank at predetermined level 16. Pump 22 is operated at a predetermined constant speed while compressor 28 delivers air under predetermined pressure to slurry feed line 24. Variables involved in the operation are controlled to cause the slurry issuing from the feed line to spread and spray downwardly into freeboard space 122. Since this space is highly heated, the sprayed slurry undergoes immediate drying, causing the concentrate particles to agglomerate while in transit through that space.

It may be helpful to consider in more detail what happens to slurry 18 as it issues from feed line 24 on its path of travel toward bed 120. Since the free and open end of the feed line depends vertically into freeboard 122, at its topmost portion, the slurry is sprayed downwardly and laterally, at least initially, in a cone-like stream through the rising highly heated roasted gases from the bed. As the slurry spreads out it is broken into a multitude of minute droplets or globules. Some of them are formed of freed slurry liquid and others are formed of concentrate particles held together by retained or contained slurry liquid. That part of the path of travel (Figure 1) may be referred to for convenience as zone A. Due to the elevated temperature of the freeboard, some of the freed slurry liquid and some of the retained slurry liquid undoubtedly is there vaporized; but this zone may be regarded essentially as the freeboard area in which the sprayed slurry is broken up into minute droplets.

The droplets descend into and through what may be considered as zone B. Here much if not all of the remaining freed slurry liquid is evaporated and removed from the freeboard via duct 124; and wet agglomerates of the concentrate particles are formed in situ while in transit through the zone. Some of the slurry liquid retained by the agglomerates is boiled off.

Such freed and retained slurry liquid as remains is evaporated as the wet agglomerates enter and pass through what may be called zone C, immediately above the fluidized bed. Here the agglomerates fall through the rising roaster gases at just about their highest temperature and are thoroughly dried before they reach the bed.

It will be understood that what has been said is intended as a general explanation of what appears to occur. There is no clear-cut boundary between the zones, obviously; there must be some overlapping. But, in any event, the path of travel pursued by the slurry as such, its resulting droplets and agglomerates, through the freeboard is so long, so extended, as to provide ample time for the slurry liquid, both free and retained, to be evaporated and for the agglomerates to become thoroughly dried before they reach the bed. In other words, no liquid is permitted to reach the bed, by way of the slurry or in any other way. All of the slurry liquid is vaporized in transit; its vapors mix with the rising roaster gases; and the gas-vapor mixture is removed continuously from the upper portion of the freeboard by way of duct 124, cyclones 126 and 128, and stack 132 to the open air.

Furthermore, the slurry liquid and the wet or damp agglomerates perform another highly useful function during their short-lived period of travel, that of intercepting, catching and returning a very substantial amount of dust or powder-like fines to the roaster bed. The slurry and agglomerates tend to act like a moving filter. Dust particles are entrained by the slurry liquid. Such entrained dust may in turn become attached to wet concentrate agglomerates or indeed may be converted into dust agglomerates which fall to the bed. A substantial amount of the dust particles as such come in contact with and are attached to the falling wet or damp concentrate agglomerates, often becoming an integral part thereof. Such dust as is not returned to the bed finds its way to duct 124 and cyclones 126 and 128; but the dust that is entrained is thoroughly dehydrated en route to the bed.

Every precaution is thus taken to assure a dry bed of agglomerates, in what may be designated as zone D, thus preventing them from bonding, due to the presence of moisture, into oversize lumps which would operate gradually to defluidize the bed. For this reason the freeboard space should be rather high, so that the period of suspension of the falling slurry and agglomerates will be sufficiently long to permit the evaporation of all of their liquid or moisture. To this end it is better to err on the side of having the height of the freeboard space somewhat higher than is necessary normally to effect the desired dehydration.

Figure 3:
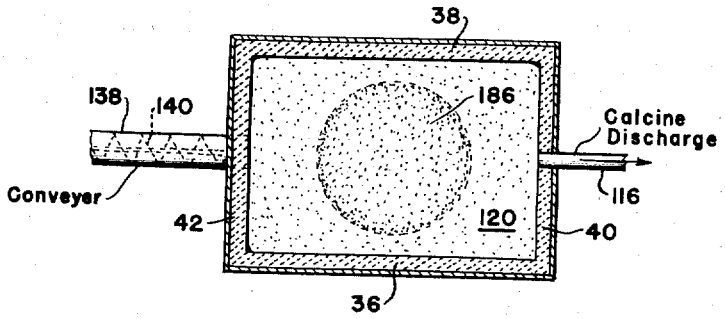
Figure 3 is a section on the line 3—3 of Figure 1, showing the top of the fluidized bed on the hearth.

As shown in Figure 3, the agglomerates dried in transit strike the top of the bed 120 in a well-defined generally circular area 186, which is easily observable through a peep-hole when the bed is quiescent. The spray pattern is formed by spraying the feed through the freeboard for a few seconds while the bed is quiescent, and allowing the dried agglomerates to ignite on the hot surface of the dead bed. The glowing of the freshly deposited agglomerates delineates the spray pattern, and permits adjustments to be made in the spray tube settings, etc. for optimum spray conditions.

Air under pressure is passed simultaneously through distributor line 70 (Figure 2) and branch outlets 74, 76 and 78 into compartments 82, 84 and 86 in air distributor or wind-box 56. The amounts of air may be varied as between the compartments by means of valved meters 92, 94 and 96, if desired, or they may be maintained substantially the same. The air in the compartments issues from the numerous air nozzles 54 above hearth plates 48, 50 and 52 in an equal number of fine streams. These many streams of air keep the finely divided agglomerates in the bed in a turbulent agitated state, thus facilitating the mixing of the new with the old agglomerates and providing intimate contact of the air with the agglomerates. Each agglomerate in effect is enveloped in and supported by air and the gaseous products of the roasting reactions, thus establishing an environment conducive to oxidation of the sulfides in the concentrate particles.

When in full operation, calcined agglomerates are withdrawn from the bed as fast as freshly formed agglomerates from the sprayed slurry are deposited on the bed. The calcines gradually find their way to and drop by gravity into and through discharge conduit 116.

The roasting operation requires a considerable amount of air, as a result of which a large amount of sulfur gas, $SO_2$ and $SO_3$, is formed. All of the water in the slurry is converted to steam. The sum total of air, gas and steam is quite substantial and is withdrawn continuously from the freeboard space. Some fines, although a relatively small amount, are produced necessarily during the roasting operation. Some of powder-like proportions tend to become entrained in the gases. The resulting gas-fines mixtures pass (Figure 1) through duct 124 to first cyclone 126, where a substantial amount of the heavier fines is separated. The thus partially denuded gases pass into second cyclone 128 where a substantial amount of the lighter fines are separated. The gases leave the last cyclone in the series for stack 132, from which they are vented into the open atmosphere.

It is preferred to return the separated fines to the roaster. To this end they are permitted to drop by gravity through down-comers 134 and 136 into feed tube 138 where they are propelled by screw-conveyor 140 into bed 120 of the roaster.

The calcines that are continuously produced play an important part in the chemical reactions that take place during the selective roasting operation as a whole. Iron oxide in the highly heated calcines in the turbulent bed functions as a catalyst promptly to convert freshly formed $SO_2$ to $SO_3$ and thus aids very substantially in the conversion of the water insoluble sulfides of nickel, cobalt and copper to their water-soluble sulfate form.

In case oversize lumps are formed by fusion, either during the initial formation of the agglomerates above the bed or during their roasting in the bed, they tend to settle to the bottom of the bed and sooner or later find their way, by reason of the action of the many fine streams of air, into and through (Figures 1, 4 and 5) over layer 164 into under layer 160, and eventually into discharge pipes 100, 102 and 104. Their valves 106, 108 and 110 may be opened from time to time to withdraw the oversize agglomerates.

Instead of withdrawing calcined agglomerates from discharge conduit 116 (Figure 1), they may be withdrawn through one or more of discharge pipes 100, 102 and 104. If desired the calcines may be withdrawn smultaneously from the discharge conduit 116 and from one or more of the discharge pipes.

As Figures 1, 4 and 5 clearly indicate, jet openings or passageways 158 in nozzles 54 are held well above the level of hearth plates 48, 50 and 52 for the purpose of preventing turbulence of the calcines on and near the plates, regardless of whether the material is made up of oversize agglomerates or not. Dead layer 160 supplants the conventional type of refractory insulating material (brick or castable refractory) and has the advantage over these of being easy to remove from the hearth plates, facilitating dismantlement of this part of the furnace for maintenance, etc.

Irregular under layer 160 (Figures 1, 4 and 5) is intended to represent generally the configuration assumed by that part of the overall static layer which may consist in part of oversize agglomerates, particularly when discharge conduit 116 is employed for the removal of calcined agglomerates. The conical depressions formed when withdrawals of oversize agglomerates are made through tubes 100, 102 and 104 are filled with regular calcines which sink down from the bed proper and become immobile. When more oversize agglomerates are formed, they sink toward the bottom plates, thus repeating the process of displacement of regular calcines.

The results just described may be facilitated by suitable adjustment of a number of variables, such, for example, as the pressure of the air jets, the size of the jet openings, their angle of inclination, their direction with respect to each other, etc. The jet openings may be rotated in a horizontal plane, by rotating fittings 144 or nipples 146, or both.

When, as is seldom the case, it is advisable to remove solids that may have found their way into compartments 82, 84 and 86, they may be dropped by gravity (Figure 4) through valved discharge pipes 114.

As indicated above, some temperature control of the freeboard and hence of the bed may be had by spraying water specially into the freeboard. To this end (Figure 1)

one or more streams of water may be sprayed from side branch feed lines 196 and 200 downwardly into the top portion of the freeboard, and preferably to the side of the conical stream of slurry being sprayed from slurry feed line 24 so as not to impair substantially the composition of the slurry liquid especially in respect of its salt content. Or, if desired, the sprayed water may be permitted to strike the sprayed slurry at any suitable stage during its descent. Also, if desired, extra water may be introduced into the slurry by way of mid branch feed line 198, thus diluting the slurry with coolant before it is sprayed into the freeboard. One or more of such expedients may be employed. The path of travel of the added water through the freeboard is sufficiently extended to assure evaporation of all of the water before it can reach the bed, so that the bed will not be wetted by such water. The water vapors join the other vapors and gases making their exit through duct 124. The specially added water thus cools the freeboard directly and the bed indirectly. It also functions to filter out dust in the rising roaster gases.

In a presently preferred practice the calcines resulting from the selective sulfate roasting operation are subjected to a water leaching treatment in a continuous countercurrent decantation system. The addition of acid is not necessary or desired for the purpose. The solids are recovered separately and dried. The liquid or filtrate also is separately recovered.

The liquid or filtrate portion, of course, contains the water soluble sulfates of nickel, cobalt and copper, and may be treated in any conventional manner to recover together or separately its nickel, cobalt and copper values. The sulfate solution may be treated, for example with soda ash, $Na_2CO_3$, to precipitate the nickel, cobalt and copper as carbonates. The resulting co-precipitates are suitably filtered, leaving a filtrate rich in sodium sulfate which is re-used as a bonding and sulfating agent for further amounts of the concentrates. Other precipitants may be used, such as lime, limestone and caustic soda. Various procedures may be employed to precipitate the metals either separately or in bulk. Sodium precipitants are particularly advantageous because the sodium may be converted into sodium sulfate to assure an adequate supply of this salt for the treatment of further amounts of the concentrates. Since the operation is conducted, normally at least, at a nickel smelter, the co-precipitates can be smelted with a charge of nickeliferous material to produce matte, which is in turn treated in the usual manner to recover separately the nickel, cobalt and copper, or the nickel and cobalt together.

The leaching operation is conducted carefully and with sufficient water to separate the water soluble sulfates therefrom. In this manner the final solid residues will be practically free of the sulfates of nickel, cobalt and copper, thus leaving an agglomerated product, almost free of slimes, that is substantially wholly iron oxide. A clean-cut separation is thus obtained between nickel, cobalt and copper on one hand and iron on the other hand.

To determine the effect of sodium sulfate, as well as its method of addition, on the metal extraction resulting from the sulfate roasting treatment, a series of fluidized bed roasting tests were performed on pyrrhotite concentrates having the following chemical analysis:

| Cu | Ni | S | Fe | Co | Insol. | $SiO_2$ |
|---|---|---|---|---|---|---|
| Percent 0.30 | Percent 1.29 | Percent 34.4 | Percent 52.6 | Percent .064 | Percent 7.6 | Percent 5.0 |

In some of the tests the pyrrhotite concentrate was roasted without benefit of sodium sulfate or any other chemical reagent. In a second group of tests, sodium sulfate was added with the pyrrhotite to form a dry solids mixture, and in a third group of tests a similar proportion of sodium sulfate was added to the pyrrhotite concentrate as an aqueous solution. Since the pyrrhotite concentrate employed in each group of tests was identical in every respect, and since roasting conditions were also identical, the average nickel extraction figures for each group clearly point up the importance of the sodium salt to the selective sulfate roasting of pyrrhotite, as follows:

| Test No. | $Na_2SO_4$ addition | Ni Extraction, percent |
|---|---|---|
| 18 | nil | 15.3 |
| 9 | 10%—dry mixture | 70.8 |
| 28 | 8%—wet mixture | 84.9 |

The extraction figures refer to the proportion of the contained nickel which was rendered water soluble by the roasting of the pyrrhotite concentrate.

The pyrrhotite concentrate employed in the above group of tests was ground to a fineness such that 60% by weight could be passed through a 200-mesh screen. When the same concentrate had been further comminuted so that 95% could be passed through a 200-mesh screen, treatment of the concentrate with an aqueous solution of sodium sulfate to give a mixture containing 8% of the salt on a dry weight basis, followed by sulfate roasting in a fluidized bed yielded a calcine from which 91% of the contained nickel could be extracted by water leaching.

The effectiveness of the agglomerating action described earlier may best be shown by the particle size distribution of calcines resulting from the fluid bed roasting of pyrrhotite flotation concentrate according to the novel feeding technique with which this invention is concerned. The pyrrhotite concentrate employed was reground to such a fineness that 97% by weight of dry concentrate could be passed through a 200-mesh screen, and which therefore contained a high proportion of colloidal or near colloidal particles usually described as slimes. The finely ground pyrrhotite concentrate was mixed with water in such proportions as to provide a slurry containing about 70% by weight of dry concentrate and 30% of water substantially free from water soluble materials.

The slurry was fed to a fluidized bed roasting furnace by pumping through a tube made from a section of standard ⅛″ pipe which projected vertically downward through the furnace roof. The slurry was introduced at a rate of approximately 5 lbs. per minute, and was accompanied by compressed air passing through the same tube at a rate of about 4 standard cubic feet per minute. The freeboard height, that is the vertical distance between the surface of the fluidized bed and the furnace roof was approximately 12 feet. Since the slurry feed tube projected some 6 inches below the furnace roof, the sprayed slurry particles were subjected to a fall of about 11½ feet before reaching the surface of the fluidized bed. Turbulence or fluidity of the bed was maintained by introducing air at the bottom of the bed at the rate of approximately 23 standard cubic feet per minute per square foot of hearth area. The temperature of the freeboard gases was about 550° C., while that of the fluidized bed was held at about 675° C. The relatively minor amounts of dust which escaped with the furnace gases were passed through two stages of cyclone dust collectors, and the dust recovered thereby was continuously returned to the fluidized bed by means of a screw feed mechanism. The calcine product was continuously withdrawn from the fluidized bed at such a rate that the level of the bed remained substantially the same throughout the entire operation. Table I gives the screen analysis of the calcine product.

TABLE I

| Mesh: | Weight percent |
|---|---|
| +6 | 0.2 |
| +10 | 1.1 |
| +14 | 3.8 |
| +20 | 8.5 |
| +28 | 13.9 |
| +35 | 16.3 |
| +48 | 11.9 |
| +65 | 9.6 |
| +100 | 9.4 |
| −100 | 25.4 |

The calcines for which the random particle size distributions are reported in Table I proved to be ideal for the maintenance of good fluidity in the bed and for smooth continuous operation of the fluidized bed roaster, even though it is evident from the same screen analysis that the proportion of material fine enough to be entrained in and carried over by the furnace gases was relatively small. Referring again to the screen analysis of the pyrrhotite feed (97%–200-mesh) it is also evident that at least 75% of the feed had agglomerated to a particle size greater than 200 mesh still leaving room for agglomeration in sizes below 200 mesh, and indicating that slurries of these types would be extremely likely to form oversized agglomerates or lumps if fed below or directly above the surface of the fluidized bed in the conventional manner. On the other hand, if the finely ground pyrrhotite had been filtered, dried, and fed to the roaster in the form of finely divided solids, agglomeration would have been negligible, and the resulting calcines with their high proportions of fine material would have been susceptible to inordinately high dust carryover and, consequently, relatively high dust losses.

During the course of the chemical reactions which take place between the agglomerates and the gases in the fluidized bed, each individual agglomerate behaves physically as a separate unit, even though it is made up of many minute concentrate particles which are interstitially bonded by slimes; but chemically its minute particles, being porously held together, are capable of reacting as separate very fine particles. In this way the reacting system possesses all of the advantages normally expected of finely divided solids in their chemical reaction with the fluidizing gases, without the usually attendant disadvantages such as, for example, high rates of dust lost.

The application of the present invention to the selective sulfate roasting of nickeliferous pyrrhotite follows logically in that the finely divided nickeliferous pyrrhotite concentrate can be made up together with the proper proportion of sodium sulfate and sufficient water to form a slurry of, say, 70% solids, and which can be pumped into the fluidized bed roasting furnace in accordance with the principles of the present invention. In an operation of this type a slurry was prepared by mixing nickeliferous pyrrhotite concentrate of which about 97% could be passed through a 200-mesh screen and which contained high proportions of slime material together with an aqueous solution of sodium sulfate in proportions which resulted in a slurry containing about 70% pyrrhotite, 27% water and 3% $Na_2SO_4$, all by weight. As in the case previously described, the slurry was fed to the fluidized bed roasting furnace through a feed tube constructed from a length of standard ⅛" pipe projecting through the centre of the furnace roof. The slurry feed rate was held at between 4 and 5 lbs. per minute, and atomizing compressed air was introduced with the slurry at a rate of 4 standard cubic feet per minute. As before, the sprayed slurry particles were subjected to a fall of about 11½ feet, this being the vertical distance between the tip of the feed tube and the surface of the fluidized bed. Air was introduced at the bottom of the bed at the rate of approximately 24 standard cubic feet per minute per square foot of hearth area, maintaining the bed in a state of turbulent fluidity.

The temperatures of the freeboard gases and of the fluidized bed were 550° C. and 675° C., respectively. In this operation the proportion of solid material carried over with the furnace gases in the form of dust was even smaller than that obtaining in the previously described operation in which sodium sulfate was not used. The recovered dust was continuously returned to the fluidized bed, and calcine withdrawal was maintained at a continuous rate compatible with the maintenance of a steady bed level. The calcines which resulted from this treatment yielded the following screen analysis:

TABLE II

| Mesh: | Weight percent |
|---|---|
| +6 | 0 |
| +10 | 5.2 |
| +14 | 7.8 |
| +20 | 15.3 |
| +28 | 19.7 |
| +35 | 17.7 |
| +48 | 10.2 |
| +65 | 6.0 |
| +100 | 5.0 |
| −100 | 12.5 |

A comparison of the random particle size distribution indicated in Table II with that shown in Table I demonstrates the extent to which the presence of sodium sulfate enhances the agglomerative action of the slime fraction occurring in the feed to the fluidized bed roasting furnace. As in the previous case, the bed material represented by the screen analysis given in Table II was admirably suited to the fluidized bed operation, from the standpoint of both mechanical and metallurgical requirements. The calcines represented by Table II were leached with water in a countercurrent decantation system, and the following metallurgical data resulted:

TABLE III

| | Weight, gm. | Percent Cu | Percent Ni | Percent Co |
|---|---|---|---|---|
| Calcines | 1,000 | 0.25 | 1.29 | 0.05 |
| Leached residue | 750 | 0.02 | 0.14 | Nil |
| Percent Extraction | | 94 | 92 | Ca. 100 |

Comparison of the above nickel extraction figure, which resulted from the roasting of pyrrhotite containing about 4% sodium sulfate, with those given earlier in this specification indicates that the proportion of sodium sulfate can be considerably reduced from the previous figure of about 8%, without incurring further loss of nickel in the leach residue. In other words, the treatment of the pyrrhotite with an aqueous solution of sodium sulfate to form a slurry which is fed to the roaster, in accordance with the principles of the present invention, doubles the efficiency of the salt by permitting a high degree of intimacy of contact between the salt and the pyrrhotite particles comprising the individual agglomerates.

The screen analysis of the leached residue was as follows:

TABLE IV

| Mesh: | Weight percent |
|---|---|
| +10 | 0.4 |
| +14 | 0.4 |
| +20 | 1.2 |
| +28 | 5.0 |
| +35 | 11.1 |
| +48 | 15.2 |
| +65 | 14.8 |
| +100 | 11.1 |
| +150 | 11.5 |
| +200 | 4.5 |
| −200 | 24.8 |
| | 100.0 |

The agglomerate size distribution of the leached residue given in Table IV will be recognized by those skilled in the art to be significantly advantageous in consideration of the leaching, washing and filtering operations which are a necessary part of all hydrometallurgical processes. Whereas the initial feed to the roaster was in such a fine state of subdivision that 97% could be passed through a 200-mesh screen, less than 25% of the final product was of this fineness. Thus the advantage of relatively dust-free operation in the fluidized bed roasting system is, by the practice of the present invention, carried through to the leaching, washing and filtering steps in roast leach processes, of which the foregoing is merely an example, by providing calcines which are easy to handle because of their relatively coarse nature.

Further advantages which the new technique of feeding sulfide slurries to a fluidized bed roasting furnace by spraying them downward through the furnace freeboard from the top of the furnace displays over conventional methods are perhaps better understood by a consideration of the behaviour of a single slurry droplet in its descent through the hot gases in the furnace chamber. Upon encountering the gases at the top of the chamber, the droplet rapidly reaches a temperature above the boiling point of its contained water or solution. Since steam is therefore emitted from the droplet during its fall, the concentration of water vapor or steam in the furnace gases is greater in the upper regions of the chamber than at any other level in the freeboard. Correspondingly, the concentration of furnace gases other than water vapor, such as oxygen, sulfur dioxide and sulfur trioxide is higher at the level of the bed surface than at the point at which the slurry is introduced into the furnace chamber. It can thus be readily seen that the gases which are chemically effective in the roasting reactions taking place in the fluidized bed suffer no dilution by steam when the contained water is eliminated from the slurry before, rather than after, it reaches the bed.

The above observations concerning the variable gaseous diluting effect of the water vapor which is a product of the dehydration of a slurry agglomerate during its descent through the furnace freeboard can be extended to the thermal dilution which occurs by virtue of the latent heat of vaporization of the water of the slurry, and the heat capacity of the steam. It may be helpful to consider, for purposes of illustration, (a) the placing of a fresh slurry agglomerate directly on the fluidized roasting bed and (b) the falling of a similar agglomerate through the freeboard gases before it encounters the bed. In the first instance, the contained water is vaporized at bed temperature, the vapor so formed removing a certain quantity of heat from the bed as it passes upward with the other gaseous roaster products. In the second instance, the heat required for the volatilization of the contained water is abstracted from the gases after they have left the fluidized bed; in other words, the water in the slurry has lowered the temperature of the gases, while that of the bed remains unaffected.

It is, therefore, evident that the feeding of sulfide slurry to a fluidized bed roasting furnace in accordance with the present invention results in an improvement in heat balance in addition to the advantages which have been described earlier in this specification. Such an improved heat balance is a significant factor in certain processes which have as their object the selective sulfate roasting of ores or concentrates in fluidized bed roasting furnaces in that the minimum feed rate compatible with the required bed temperature corresponds to the maximum average retention time of the solid particles in the fluidized bed. In other words, since under normal operating conditions, calcines are removed from the fluidized bed at the same rate as that at which feed is introduced, the average retention or treatment time of the roasting solids is an inverse function of the feed rate, and therefore any means by which the feed rate can be reduced increases the extent to which reactions are completed by increasing the treatment time. It follows, then, that in the autogenous fluidized bed sulfide roasting processes with which this invention is concerned, improvements in heat balance brought about by the practice of the invention result in longer solids retention time, and hence in more completely reacted calcines.

The water vapor which forms when a slurry droplet dries also increases the total volume of the furnace gases, and, at any given temperature, brings about a corresponding increase in the space velocity of the uprising gases. Since dust carryover is a function of the linear space velocity of the furnace gases, it is in the interests of good operation to keep the space velocity as low as is practicable. The direct addition of slurry to the fluidized bed obviously increases the space velocity, and hence the dust load, of the gases passing upwardly through the bed, whereas when slurry dehydration takes place in the freeboard zone, the space velocity in the bed remains unaffected. Moreover, any increase in the mass of the freeboard gases due to slurry water vapor is not accompanied by a corresponding increase in volume and space velocity because of the counteracting shrinkage which is brought about by the cooling effect of the slurry on the gases. Thus the previously described advantages of the invention relating to the effective removal of dust as such by its adherence to moist slurry particles are augmented by the reduced extent to which dust is allowed to leave the fluidized bed by gaseous entrainment.

Still further advantages which the invention has over the conventional methods of slurry feeding to fluidized bed roasting furnaces will be apparent to those skilled in this art in consideration of the wide variety of slimy and adhesive materials which may be included in sulfide slurries in the practice of the present invention. For example, in copper roast-leach processes, in which it is required to selectively sulfate-roast sulfide-bearing slurries in furnaces of the fluidized bed type, the presence of oxidized copper minerals in the slurry has heretofore been disadvantageous because of the tendency of such minerals to overgrinding in the prior milling treatment, with the consequent occurrence of slimes which would result in the formation of de-fluidizing lumps in the roasting bed. Such oxidized slime-bearing sulfide slurries are easily and successfully treated when fed to the fluidized bed roaster in accordance with the principle of the present invention.

Similarly, it can happen that such a slurry is deficient in the sulfur which is required, in practice, to form sulfates of all of the copper present, even though thermal requirements are satisfied, in which case it might be desirable to make up the sulfur deficiency by the addition to the slurry of spent or waste electrolyte which contains sulfuric acid and iron sulfate. Again, the addition of such solutions would be a hazardous undertaking if the mixture were to be fed to the fluidized bed according to conventional methods, but would be eminently practicable in application of the present invention.

Another, perhaps more striking, way in which the principles of this invention can be applied is in the fluidized bed roasting of ores or concentrates which do not, at the outset, contain significant proportions of slime material. For example, certain pyritic flotation concentrates containing lead, zinc and copper were mixed with about 0.75 percent sodium sulfate and subjected to a selective sulfating roast in a fluidized bed roasting furnace. Since the concentrates contained negligible quantities of slimes and only a minor addition of water soluble material, little, if any, intergranular agglomeration took place, and dust carryover and losses were relatively high. Moreover, fluidization characteristics of the bed thus produced were poor. In this case it proved advantageous actually to add as slime material a suitable argillaceous substance, such as bentonite, to the concentrate, in order to effect the intergranular bonding or agglomerative action with which the present invention is concerned.

Not only did the deliberate addition of slimes sharply reduce the proportion of bed material carried over as dust, but it also brought about a decided improvement in metallurgical efficiency, as shown in comparison of the following data which resulted from two experiments in which a pyritic lead, zinc and copper concentrate was subjected to fluidized bed roasting treatment, the calcines being leached with dilute sulfuric acid. Conditions of the two tests were identical except as noted below:

| Test No. | Percent Bentonite | Percent $Na_2SO_4$ | Percent Extraction | | |
|---|---|---|---|---|---|
| | | | Zn | Cu | Fe |
| 13 | 0 | 0.75 | 72.0 | 73.3 | 13.4 |
| 14 | 2.0 | 0.75 | 91.2 | 93.2 | 4.0 |

The above figures show that the addition of 2% bentonite not only improved the extraction of the desired metals, but also resulted in a cleaner separation between the zinc and copper on the one hand, and the iron of the concentrate on the other hand.

Not only in the field of selective sulfate roasting, but also in processes in which simple oxidation is the end in view, can the invention be profitably applied. For instance, certain types of sulfide and/or sulfarsenide flotation concentrates contain gold, partly in a "free-milling" form and partly in a refractory, or "locked" form. In such an instance, it is desirable to extract the "free-milling" gold by extremely fine grinding of the concentrate, following by amalgamation or cyanide leaching. The residue resulting from such a treatment is then roasted in order to free the "locked" fraction of the gold for its extraction by a second cyanide leaching treatment, and it is in its application to the fluidized bed roasting of such finely divided slime-bearing materials that this process can be used to advantage.

The above two examples, among others described herein, are, it is believed, fairly representative of many further useful applications of the invention which will doubtless occur to those skilled in this art. In the present specification the terms "slimes" and "slime particles" are meant to include particles of sulfides or oxide minerals, especially those of a taley or argillaceous nature, of extremely fine particle size, colloidal or near colloidal dimensions, as well as the materials generally referred to as gelatinous hydroxide precipitates such as those produced by the addition of alkalis to solutions which contain salts of metals such as iron or aluminum. The term "water-soluble materials" is meant to include any water soluble inorganic salt, acid or alkali, as well as such inorganic water soluble material as it may prove advantageous to add to a sulfide slurry in the practice of this invention.

*Reference is made to my copending applications Serial No. 426,754 filed April 30, 1954 (since issued as Patent 2,813,016, November 12, 1957) and Serial No. 426,753 also filed April 30, 1954.*

I claim:

1. In the method of roasting metal sulfide concentrates, the improvement which comprises maintaining a hot fluidized bed of agglomerates in which roasting takes place [autogenously] and from which hot roasting gases rise continuously into the freeboard space above the bed, spraying an aqueous slurry containing the metal sulfide concentrates and a binding agent with compressed air into the freeboard space to produce a multiplicity of small droplets containing a plurality of the concentrate particles which descend downwardly through said freeboard space in countercurrent contact with the rising hot gases from the bed, the hot gases first evaporating water from the droplets to convert them into wet agglomerates in which the concentrate particles are bonded by the binding agent and then evaporating water from the wet agglomerates to form dry agglomerates which on continued descent through the hot gases enter the fluidized bed, venting the resulting mixture of vapors and gases from the upper portion of the freeboard space, and removing the agglomerates from the fluidized bed after they have been roasted therein.

2. Method according to claim 1, in which the aqueous liquid for preparing the slurry contains a salt.

3. Method according to claim 1, in which the aqueous liquid for preparing the slurry contains an alkali metal salt.

4. Method according to claim 1, in which the aqueous liquid for preparing the slurry contains sodium sulfate.

5. Method according to claim 1, in which the spraying of the slurry is conducted wholly in the freeboard space of a roasting chamber having a roof and at least one side wall to prevent contact of slurry with the roof and side wall of the roasting chamber and hence to avoid sulfide accretions thereon.

6. Method according to claim 1, in which the temperature of the fluidized bed is regulated in part at least by regulating the temperature of the freeboard space, and the temperature of the freeboard space is regulated by regulating the amount of aqueous liquid in the slurry sprayed into the freeboard space.

7. Method according to claim 1, in which the temperature of the freeboard space is regulated by spraying regulated amounts of water, other than and separate from that contained in the slurry, into the freeboard space, the sprayed water is vaporized completely in the freeboard space so that it cannot reach and wet the fluidized bed, and the resulting water vapor is admixed with said vapors and gases vented from the freeboard space.

8. Method according to claim 1, in which dust particles entrained in the hot gases rising from the fluidized bed are brought in contact with the sprayed slurry whereby the freshly formed agglomerates, and a substantial amount of the dust particles will adhere to the agglomerates descending through the freeboard space to the bed instead of escaping from the freeboard space with the vapors and gases.

9. Method according to claim 1, in which the concentrate particles are extremely small to inhibit kernel roasting.

10. Method according to claim 1, in which the concentrate particles are sufficiently small to pass for the most part through a 200-mesh screen to inhibit kernel roasting.

11. Method according to claim 1 in which slimes are present in the slurry at least in part in the form of specially added argillaceous material.

12. Method according to claim 1, in which slimes are present in the slurry at least in part in the form of specially added bentonite.

13. Method according to claim 1, in which the agglomerates are of random size and sufficiently small to pass for the most part through a 4-mesh screen.

14. Method according to claim 1, in which the agglomerates are sufficiently small to pass in graded portions through a series of screens between about 4 to about 100 mesh to provide random sizes conducive to good fluidity in the bed.

15. Method according to claim 1, in which the concentrates are in the form of pyritic flotation concentrates containing lead, zinc and copper.

16. Method according to claim 1, in which the concentrates are in the form of copper sulfide.

17. Method according to claim 1, in which the concentrates are in the form of zinc sulfide.

18. Method according to claim 1, in which the concentrates contain gold partly in a free-milling form and partly in a refractory locked form.

19. Method according to claim 1, in which the concentrates are in the form of iron sulfide.

20. Method according to claim 1, in which the metal sulfide concentrates include iron sulfide; the roasting operation is continued in the presence of a sulfating agent until substantially all of the metal sulfide other than iron sulfide present in the agglomerates is converted into water-soluble sulfate of that metal and substantially all of the sulfide of iron present in the agglomerates is converted into water-insoluble oxide of iron.

21. Method according to claim 1, in which the metal sulfide concentrates include iron sulfide; the concentrate particles are extremely small to inhibit kernel roasting; the roasting operation is continued in the presence of a sulfating agent until substantially all of the metal sulfide other than iron sulfide present in the agglomerates is converted into water-soluble sulfate of that metal and substantially all of the sulfide of iron present in the agglomerates is converted into water-insoluble oxide of iron.

References Cited in the file of this patent

UNITED STATES PATENTS

| | | |
|---|---|---|
| 2,090,388 | Hardiek | Aug. 17, 1937 |
| 2,094,275 | Mitchell | Sept. 28, 1937 |
| 2,475,984 | Owen | July 12, 1949 |
| 2,586,818 | Harms | Feb. 26, 1952 |
| 2,607,662 | Huff | Aug. 19, 1952 |
| 2,648,600 | Reeve | Aug. 11, 1953 |
| 2,677,608 | McKay et al. | May 4, 1954 |
| 2,693,409 | Stephens | Nov. 2, 1954 |